Aug. 13, 1929.  E. V. LAWRENCE  1,724,292
BRAKE
Filed March 26, 1925   5 Sheets-Sheet 1
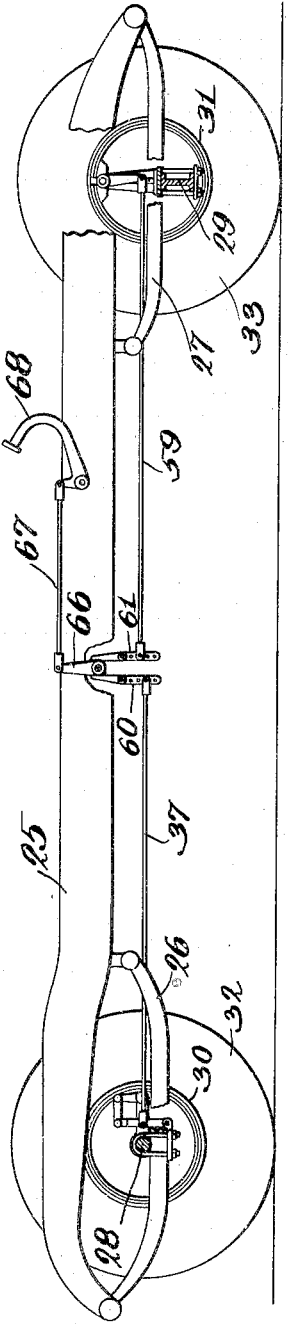
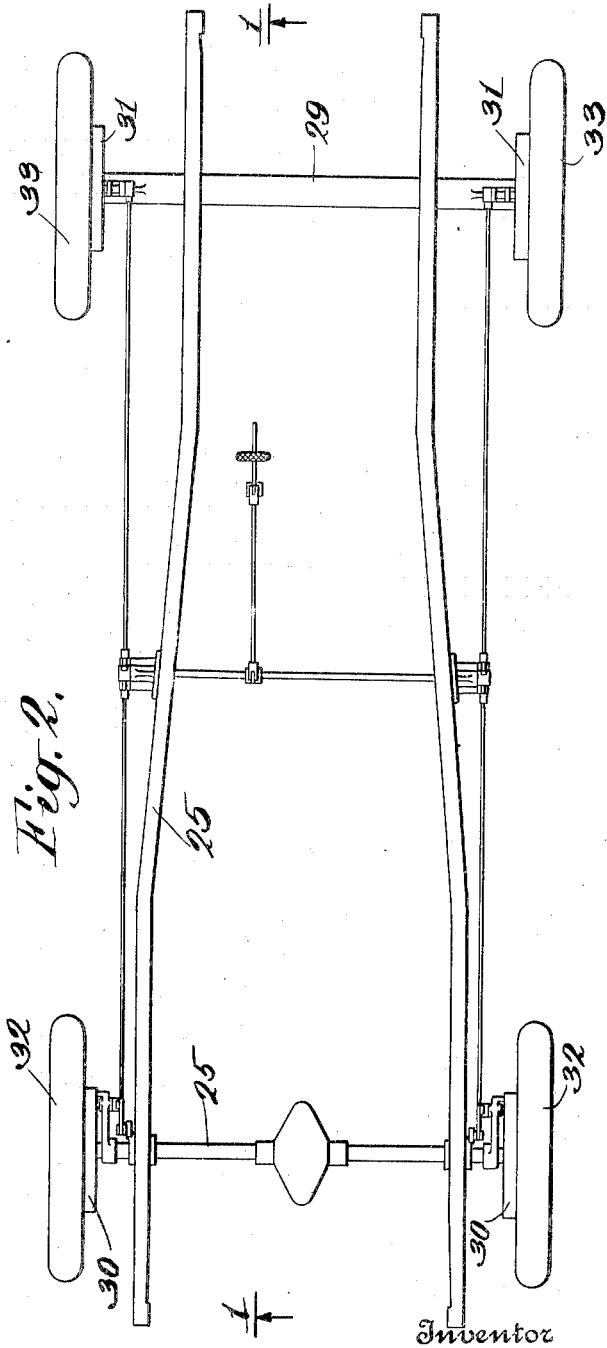
Inventor
Edward V. Lawrence
By his Attorney
R. J. Dearborn Aug. 13, 1929.  E. V. LAWRENCE  1,724,292
BRAKE
Filed March 26, 1925   5 Sheets-Sheet 2
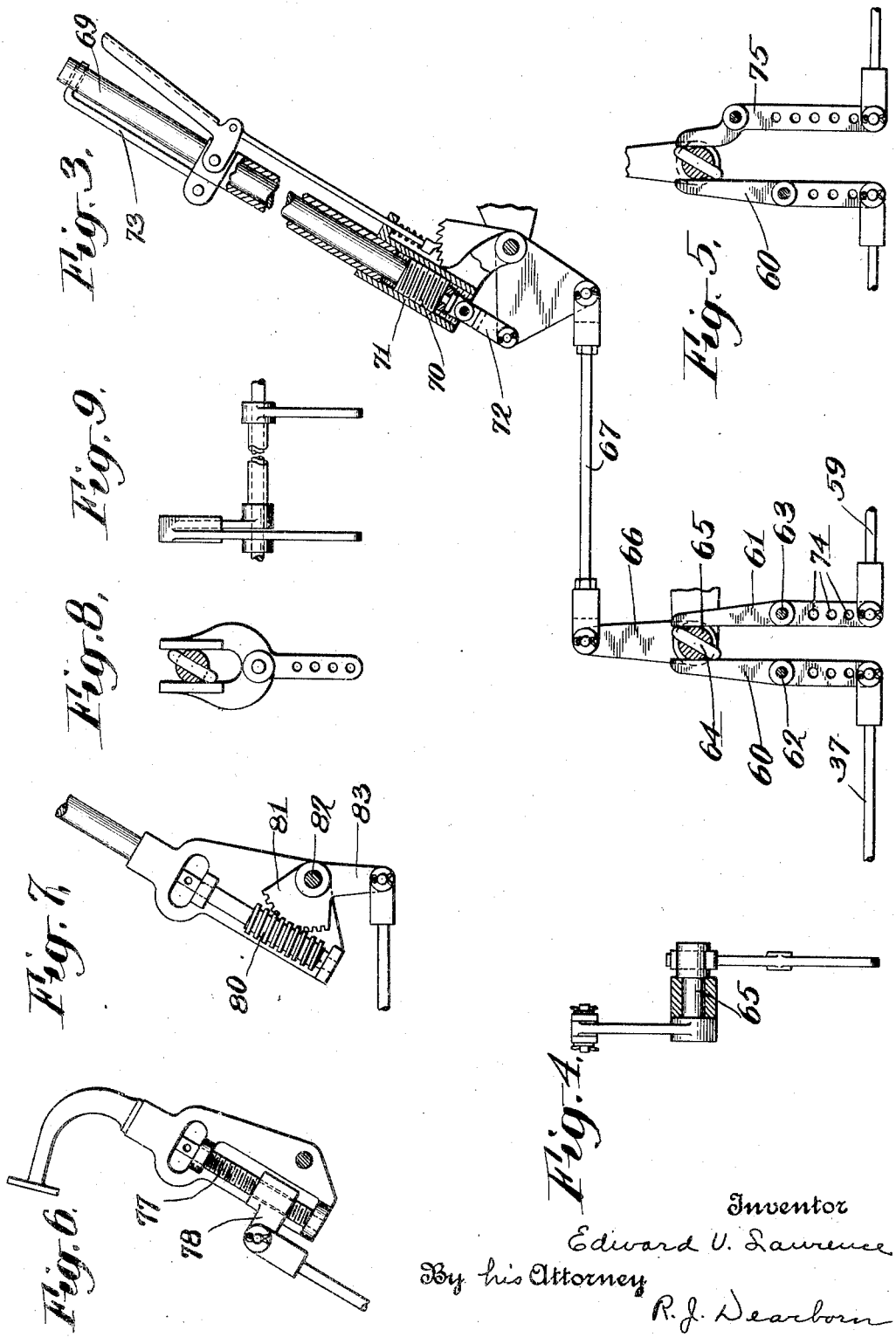
Inventor
Edward V. Lawrence
By his Attorney
R. J. Dearborn

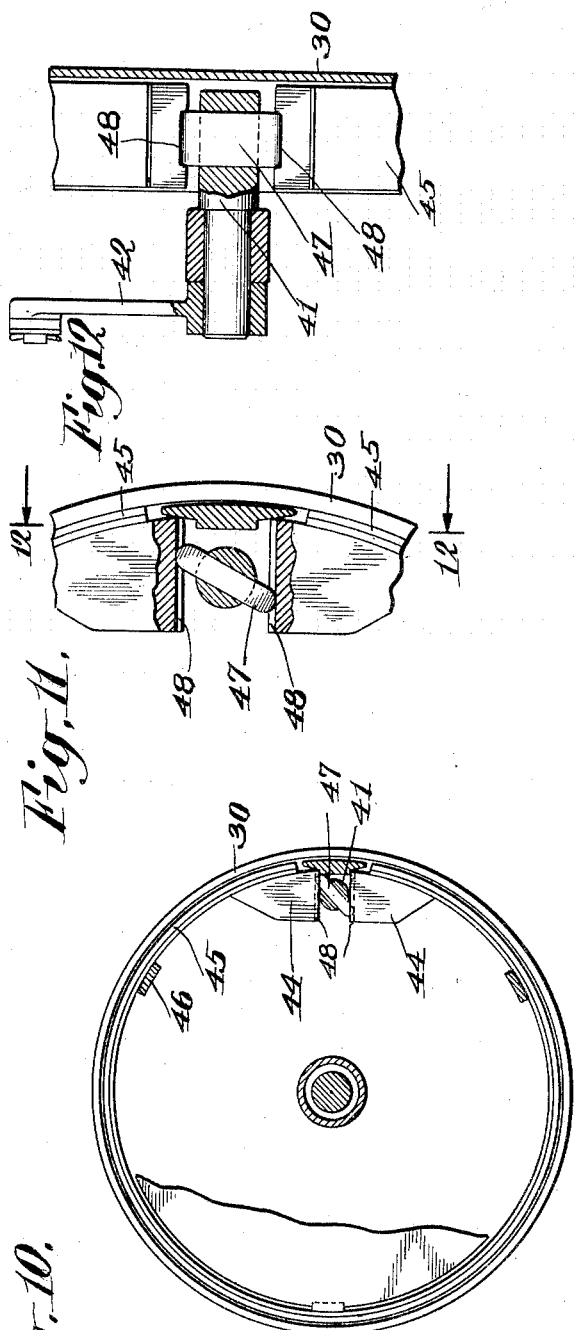

Aug. 13, 1929.   E. V. LAWRENCE   1,724,292
BRAKE
Filed March 26, 1925   5 Sheets-Sheet 4

Inventor
Edward V. Lawrence
By his Attorney
R. J. Dearborn

Aug. 13, 1929.                E. V. LAWRENCE                1,724,292
                                  BRAKE
                           Filed March 26, 1925        5 Sheets-Sheet 5
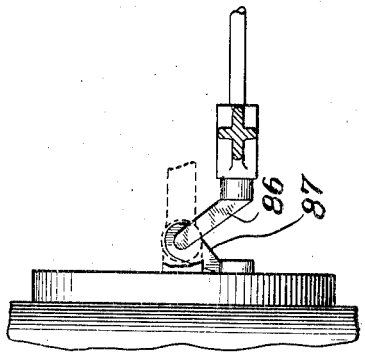
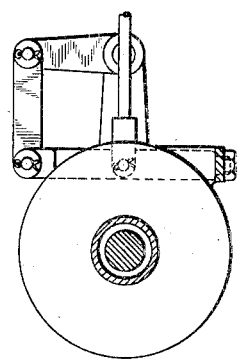
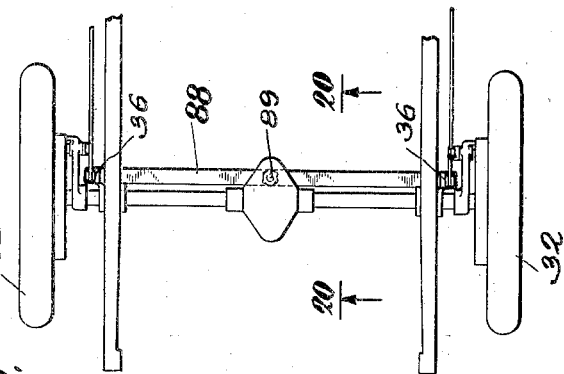
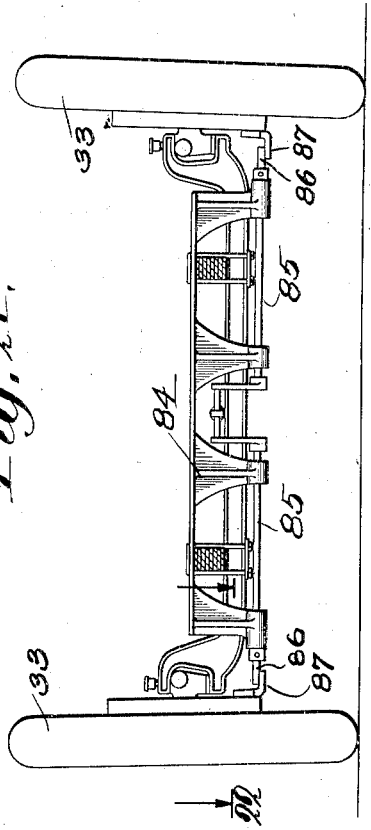
Inventor
Edward V. Lawrence
By his Attorney
R. J. Dearborn Patented Aug. 13, 1929.

1,724,292

UNITED STATES PATENT OFFICE.

EDWARD V. LAWRENCE, OF DUMONT, NEW JERSEY, ASSIGNOR TO E. V. LAWRENCE SAFETY BRAKE COMPANY, INC., A CORPORATION OF NEW YORK.

BRAKE.

Application filed March 26, 1925. Serial No. 18,339.

My invention relates to brakes and brake-controlling apparatus for vehicles, and has special reference to brakes which are adapted to be applied to the steered wheels, as well as the driving wheels of automobiles, and are commonly known as four-wheel brakes.

More specifically, from the standpoint of the actuating mechanism my invention relates to improvements in brakes of the kind shown in Cookingham Patent No. 870,666 and in Brinton et al. Patent 1,360,089.

One object of my invention is to provide a brake mechanism which will insure equalization of braking action among the four wheels.

A further object is to provide an actuating mechanism adapted for ready adjustment or take-up.

A still further object is to avoid the socalled "effective" lengthening or shortening of the brake rod when the brake is applied, due to the turning of the axle accompanied by a distortion of the spring caused by the brake application.

A further object is to provide a front wheel brake attachment suitable for application to standard makes of automobiles, without substantial modification of the standard parts.

Other objects and advantages of my invention will be set forth hereinafter.

Referring to the drawings:

Figure 1 is a sectional elevation and

Figure 2 is a plan view of a vehicle chassis equipped with the brake mechanism of my invention, Figure 1 being taken on the line 1—1 of Figure 2.

Figure 3 is a partially sectional detail view of the brake actuating mechanism, including a brake equalizer which forms a part of my invention and one form of take-up or brake adjustment mechanism.

Figure 4 is an elevation of the equalizing mechanism taken at right angles to Figure 3.

Figure 5 shows a modified brake equalizing mechanism which also embodies my invention.

Figures 6 and 7 show different modified take-up or brake adjusting mechanisms.

Figure 8 corresponds to Figure 5 and illustrates a further modification of the brake equalizer.

Figure 9 is an elevation at right angles to Figure 8.

Figure 10 is a sectional detail of a brake drum and actuating mechanism embodying my invention.

Figure 11 is an enlarged detail view of the actuating mechanism shown in Figure 10.

Figure 12 is a sectional view taken on the line 12—12 of Figure 11.

Figure 13 is an elevation of the brake mechanism shown in Figure 10 with the automatic slack adjustor mechanism of my invention illustrated.

Figure 14 is a sectional elevation on the line 14—14 of Figure 13.

Figure 15:
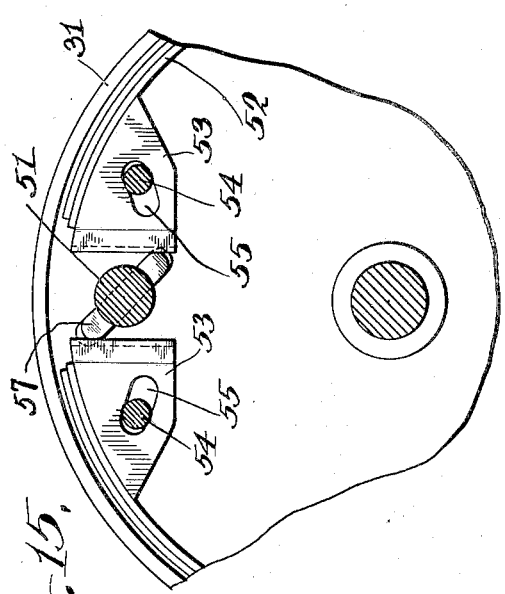

Figure 15 is a still further modification of my brake actuating mechanism, and

Figure 16:
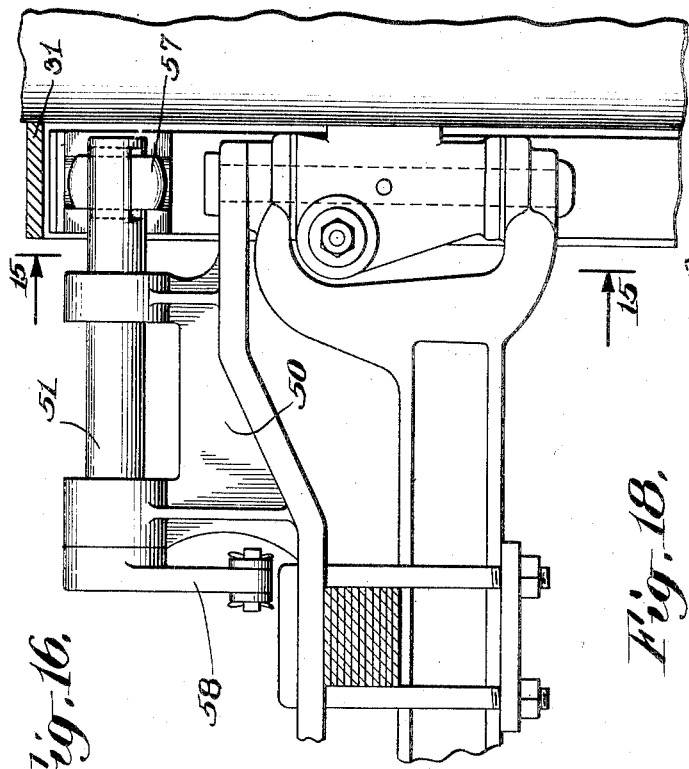
Figure 18:
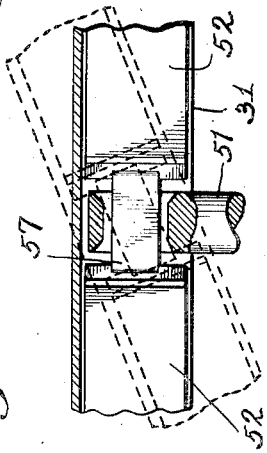
Figure 17:
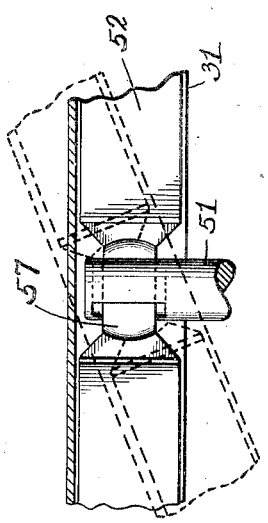

Figures 16, 17 and 18 illustrate how it is applied to a steered wheel, Figure 15 being taken on the line 15—15 of Figure 16.

Figure 19 is an elevation of a brake attachment, embodying my invention, Figure 20 being a sectional elevation taken on the line 20—20 of Figure 19.

Figure 21 is a front elevation of the attachment shown in Figure 19, and

Figure 22 is a plan view looking in the direction of the arrow 22 in Figure 21.

Referring first to Figures 1 and 2, the chassis illustrated comprises a frame 25, springs 26 and 27 to which rear axle 28 and front axle 29 are respectively attached. The brake drum 30 is attached to each rear wheel 32 and the brake drum 31 to each front wheel 33. The brake mechanism comprises an automatic slack adjuster mechanism for each rear wheel brake, as illustrated in Figures 13 and 14, and an expanding internal brake band or shoe as shown in Figures 10, 11, and 12, and each of the front wheels comprises a brake actuating mechanism as illustrated in Figures 15, 16, 17 and 18, while the front and rear brake actuating mechanisms are interconnected through an equalizing mechanism as shown in Figures 3 and 4.

Referring first particularly to Figures 10 to 14 inclusive, it will be observed that the bracket 34 is secured to the axle housing by a U-bolt 35, and is provided with a lug forming a pivot for a lever 36, to which the brake actuating pull rod 37 is pivoted at an intermediate point 38. The lever extends about equally above and below the center of the axle 28 and the pivot point 38 where the pull rod connects, is substantially opposite the center of the axle.

A bracket 39 extends forwardly close to the brake drum periphery and forms a bearing at 40 for a rocker stud 41, to which a lever 42 is attached. The lever 42 extends upwardly and is connected by a link 43 with the lever 36, the arrangement being such as to provide a parallel motion device which minimizes the effect of any rotary turning of the axle housing resulting from distortion of the spring when the brakes are applied.

The stud 41 extends between the enlarged ends 44 of the brake band 45 which is disposed within the brake drum 30 and is held loosely in place by guiding supports 46 which permit the band to float in accordance with the principles set forth in the aforesaid Brinton et al. patent.

The stud is perforated to receive a sliding cam 47 which is free to adjust itself through the slot in the stud, but which tends to spread the ends of the brake band and apply the brake when the stud is turned.

The sliding cam must of necessity fit loosely in the slot in the stud and I have provided guide slots 48 in the end blocks 44 into which the ends of the sliding cam 47 extend, as clearly shown in Figure 11. This arrangement greatly improves the action of the brake and as hereinafter explained, it is particularly valuable in case the brake is applied to a steered wheel which necessitates a considerably enlarged slot in the actuating stud to allow for the turning movement of the wheel.

Special reference may now be had to Figures 15 to 18 inclusive, which show a similar brake applied to the steered front wheels of the vehicle. In this arrangement a bracket 50 is mounted rigid with the front wheel and carries a brake actuating stud 51 which extends directly over the axis of the steering knuckle. The arrangement is such that when the wheel turns with its brake band, the end of the stud occupies substantially the same position with reference to the band except the change is directly caused by the angular turning of the wheel. The brake drum carries a brake band 52 corresponding to the band 45 and having end blocks 53 corresponding to the blocks 44 and similarly slotted. The blocks 53, however, are mounted to permit the floating action of the brake band by supporting pins 54 which extend into slots 55 in the blocks 53.

The stud 51 has an open slot 56 which carries a sliding cam 57 but is so formed as to permit the free turning of the sliding cam to enable it to follow the movement of the wheel when it is steered. Attention is particularly directed to the fact that the slots in the brake blocks 53 which guide the ends of the sliding cam are particularly valuable in maintaining the proper relation between the sliding cam and the brake and permit it to function effectively irrespective of the position of the wheel. This is one of the important features of my invention.

At the inner end of the stud 51 is a lever or actuating arm 58, to which a pull rod 59, as shown in Figure 1, is pivotally connected. The pull rod 37 is connected to the lower end of an equalizer lever 60 and the pull rod 59 is similarly connected to a second equalizer lever 61. These levers as clearly shown in Figure 1 and Figure 3, are pivoted at 62 and 63 respectively, and are spaced a short distance apart, so that their upper ends may be spread or separated by a sliding cam 64 mounted in a rocker stud 65 which is actuated by a lever 66 responsive to a link or pull rod 67 which may be actuated in the usual way by a bell crank pedal lever 68 as shown in Figure 1, or by a hand brake lever 69, as shown in Figure 3. The main arm of the lever 69 is readily adjustable in its effective length by turning it on its longitudinal axis. The take-up arrangement is provided by a threaded enlargement 70 mounted in an internally threaded sleeve 71, the lever 69 being connected to a fixed link 72 by a clevis joint as clearly illustrated. When the handle is adjusted to the position desired, it is held from accidental turning by a locking lever 73.

The lower extensions of the equalizing levers 60 and 61 are perforated as shown at 74 to permit the ready adjustment of the pull rod connections and the levers may be unequally pivoted if desired, so that a greater motion will be produced for the front wheel brakes than is provided from the rear or vice versa. Such an arrangement is shown in Figure 5, in which an equalizing lever 75 is substituted for the lever 61. The equalizing levers may be mounted on a single pivot by changing their shape, as shown in Figures 8 and 9.

The adjustment or take-up of the brake may be applied by the arrangement shown in Figure 6, in which a screw stud 77 is mounted in the pedal lever and carries a traveling nut 78 having a lug to which the brake pull rod is connected or the threaded stud may take the form of a worm 80 as shown in Figure 7 to cooperate with the worm wheel sector 81 mounted at 82 and having an extension arm 83 to which the pull rod is connected.

The brake actuating mechanism may be mounted on a frame 84 which constitutes an attachment for a standard make of automobile. The frame carries rocker arms 85 which have lateral extensions 86 as shown in Figure 22, adapted to cooperate with an extension 87 of the front wheel brake actuating mechanism, the two parts coming in contact in line with the axis of the steering knuckle, thus being always available to actuate the brake irrespective of the position of the steering wheel. A similar attachment in the form of a cross-bar 88 is mounted on the rear axle and carries an automatic slack adjuster mechanism as shown in Figure 20. This mechanism need not be described in detail, and corresponds to that shown in Figure 13 except it is of importance to note that the bar 88 is centrally pivoted at 89 and so may act as an equalizer for the rear brakes, the link 36 (see Figure 13) being pivoted on the end of the bar 88 instead of on the fixed shackle 34.

What I claim is:

1. A cylindrical brake drum, an expandable interrupted ring therein, an end block at each of the adjacent ends of the ring, each of the end blocks being provided with a guide slot, a supporting pin extending into each of said slots for guiding the movement of the blocks, a relatively stationary rotatable actuating stud adjacent the ring, and a sliding cam adapted to be actuated by the rotatable stud and to cooperate with the end blocks of the interrupted ring to actuate the ring.

2. The combination with a steered wheel pivotally mounted on a steering knuckle, of a brake drum having an internal brake surface, an interrupted ring mounted within the drum adapted to be expanded into contact therewith, a rocker stud fixed relatively to the axle of the wheel and extending between the ends of the interrupted brake ring, a sliding cam extending through a slot in the rocker and cooperating with guide slots in the ends of the brake ring, the arrangement being such as to permit the sliding cam to follow the movement of the brake ring when the wheel is steered while being responsive to the actuation of the rocker stud.

In witness whereof, I have hereunto set my hand, this 7 day of March, 1925.

EDWARD V. LAWRENCE.